United States Patent [19]

Rudolph

[11] Patent Number: 4,544,279
[45] Date of Patent: Oct. 1, 1985

[54] APPARATUS FOR MIXING AND PROPORTIONING SEVERAL MIXING COMPONENTS

[75] Inventor: Joachim Rudolph, Weil der Stadt, Fed. Rep. of Germany

[73] Assignee: Werner and Pfleiderer, Stuttgart, Fed. Rep. of Germany

[21] Appl. No.: 653,722

[22] Filed: Sep. 21, 1984

Related U.S. Application Data

[62] Division of Ser. No. 421,968, Sep. 23, 1982, Pat. No. 4,498,783.

[30] Foreign Application Priority Data

Nov. 25, 1981 [DE] Fed. Rep. of Germany ....... 3146667

[51] Int. Cl.$^4$ ............................................. B01F 15/02
[52] U.S. Cl. ...................... 366/132; 177/70; 222/1; 366/141; 366/156; 366/162; 366/177
[58] Field of Search ............... 366/141, 132, 156, 160, 366/162, 134, 177, 179, 18, 29, 16, 19; 222/1, 55, 56, 77; 177/70

[56] References Cited

U.S. PATENT DOCUMENTS

| 2,105,266 | 1/1938 | Rendall | 366/141 |
| 3,608,869 | 9/1971 | Woodle | 366/177 |
| 4,232,781 | 11/1980 | Muller | 222/55 |
| 4,272,824 | 6/1981 | Lewinger | 366/141 |

FOREIGN PATENT DOCUMENTS

| 135145 | 11/1949 | Australia | 366/156 |
| 2149242 | 4/1972 | Fed. Rep. of Germany |  |
| 2247518 | 4/1974 | Fed. Rep. of Germany |  |
| 2336104 | 2/1975 | Fed. Rep. of Germany |  |

Primary Examiner—Robert W. Jenkins
Attorney, Agent, or Firm—Laff, Whitesel, Conte & Saret

[57] ABSTRACT

In a process for mixing and proportioning a plurality of mixing components, the latter are supplied in individually weighed manner to a continuous mixing process and the mixture is subsequently continuously removed in a proportioned manner. For this purpose, a mixer, metering feed means positioned upstream of the mixer and a continuously proportioning removal device positioned downstream of the mixer are provided. In order to ensure a troublefree addition and an accurately proportioned removal, the individual mixing components are in each case successively supplied in timed continuous manner to the mixing process, accompanied by the weighing of the total mixing material. During the feed pauses, the mixture is gravimetrically controlled and during addition is removed in volumetrically controlled manner. For this purpose the mixer, together with the removal device, is arranged on a weighing machine and the feed means and removal device are controlled by the weighing machine by means of a regulating and control device.

2 Claims, 3 Drawing Figures

APPARATUS FOR MIXING AND PROPORTIONING SEVERAL MIXING COMPONENTS

This is a division of application Ser. No. 06/421,968, filed Sept. 23, 1982, now U.S. Pat. No. 4,498,783.

BACKGROUND OF THE INVENTION

The invention relates to a process for mixing and proportioning a plurality of mixing components in which, individually weighed, the mixing components are supplied to a continuous mixing process and the mixture is then removed in a continuously proportioned manner. The invention also extends to an apparatus for performing such a process.

Such processes and apparatuses are primarily used in order to mix several mixing components and supply them in proportioned manner to an extruder for further processing. In general a main mixing component representing the largest proportion by weight, e.g. plastic granular material is mixed with various mixing components having a smaller weight, e.g. dye additives, stabilizers, etc. For such extruders to operate in a satisfactory manner, the devices connected upstream thereof for mixing and proportioning the mixing components must operate continuously on their discharge side.

In this connection it is known from German Offenlegungsschrift No. 22 47 518 to construct at least the feed means for the proportionally smaller mixing components as timed weighing machines, whereas the feed means for the larger mixing component is gravimetrically controlled and continuously proportioned, e.g. as a belt weighing machine.

Removal takes place by means of a discharge screw, which is driven at a given speed, i.e. a volumetrically proportioned removal takes place. The mixing process in the mixer takes place in two stages in a conical screw mixer, the addition of the individual mixing components taking place in a pre-mixing zone and a substantially feed-neutral zone is formed between the pre-mixing zone and a post-mixing zone. Removal from the post-mixing zone takes place by means of a removal device constructed as a proportioning screw, which then supplies a mixture to an extruder. In this known apparatus and process, the individual weighing of the mixing components involves high effort and expenditure and can lead to faults, particularly if difficulty flowing mixing components are used. In addition, the proportioning accuracy of the removal side in not adequate.

It is also known to supply the individual mixing components to the mixer in a continuous manner by means of belt weighing machines. It is already known from German Offenlegungsschrift No. 21 49 242 to supply the main mixing component continuously by means of a belt weighing machine and the other mixing components continuously by means of volumetrically proportioning feed means. All continuous weighing means, particularly belt weighing machines, are extremely costly. In addition, and particularly in the case of belt weighing machines, there is also the problem of their high susceptibility to error when contaminated by dust and the like, so that frequent recalibration is necessary.

German Offenlegungsschrift No. 23 36 104 discloses arranging on a weighing machine a bin for receiving a charge of mixing components to be mixed together and said bin is followed by a conical screw mixer. The individual components are successively supplied, after corresponding weighing to the bin. As a result there is no need for a weight-constant removal behind the conical screw mixer over a period of time.

SUMMARY OF THE INVENTION

The object of the invention is to provide a process of the aforementioned type in which on the one hand troublefree addition and on the other hand accurately proportioned removal are ensured.

A further object of the invention is to provide an apparatus for performing this process.

Accordingly, one aspect of the present invention provides a process for mixing and proportioning a plurality of mixing components in which, individually weighed, the mixing components are supplied to a continuous mixing process and the mixture is then removed in a continuously proportioned manner, the individual mixing components being successively supplied to the mixing process in timed continuous manner, accompanied by the weighing of the total mixing material, and during the feed pauses the mixture being gravimetrically controlled and being removed in volumetrically controlled manner.

Another aspect of the invention provides apparatus for mixing and proportioning a plurality of mixing components, said apparatus comprising a mixer, proportioning feed means for the mixing components located upstream of the mixer, a continuously proportioning removal device for the mixture positioned downsteam of the mixer for performing the above-described process, said apparatus including a weighing machine and a regulating and control deivce, said mixer and removal device being positioned on said weighing machine and said feed means and removal device being controllable by the said weighing machine via said regulating and control device.

It is essential that all of the material to be mixed and which is involved in the mixing process is constantly weighed, so that on the basis of the running results of this weighing process, the addition of the individual mixing components can be successively controlled. In the same way removal can be gravimetrically controlled, at least during the times when no addition is taking place. In order to carry out this continuous total weighing of the material to be mixed, the complete mixer, together with the removal device is arranged on the weighing machine from which the signals corresponding to the particular weight are passed to the regulating and control device for further processing. Following corresponding evaluation of the actual values from the weighing machine and of the preprogramed desired values, this device supplies corresponding control signals.

As weighing takes place in the vicinity of the actual mixing process, the feed means can be constructed as volumetrically proportioning feed means, which however operate in a gravimetrically controlled manner. Thus, there is no need to provide belt weighing machines and instead much less complicated proportioning screws are adequate.

During the addition of the individual mixing components the removal device, after being gravimetrically controlled in the feed intervals, is volumetrically further controlled.

BRIEF DESCRIPTION OF THE DRAWINGS

The invention will now be further described, by way of example, with reference to the drawings, in which.

DESCRIPTION OF PREFERRED EMBODIMENTS

Figure 1:
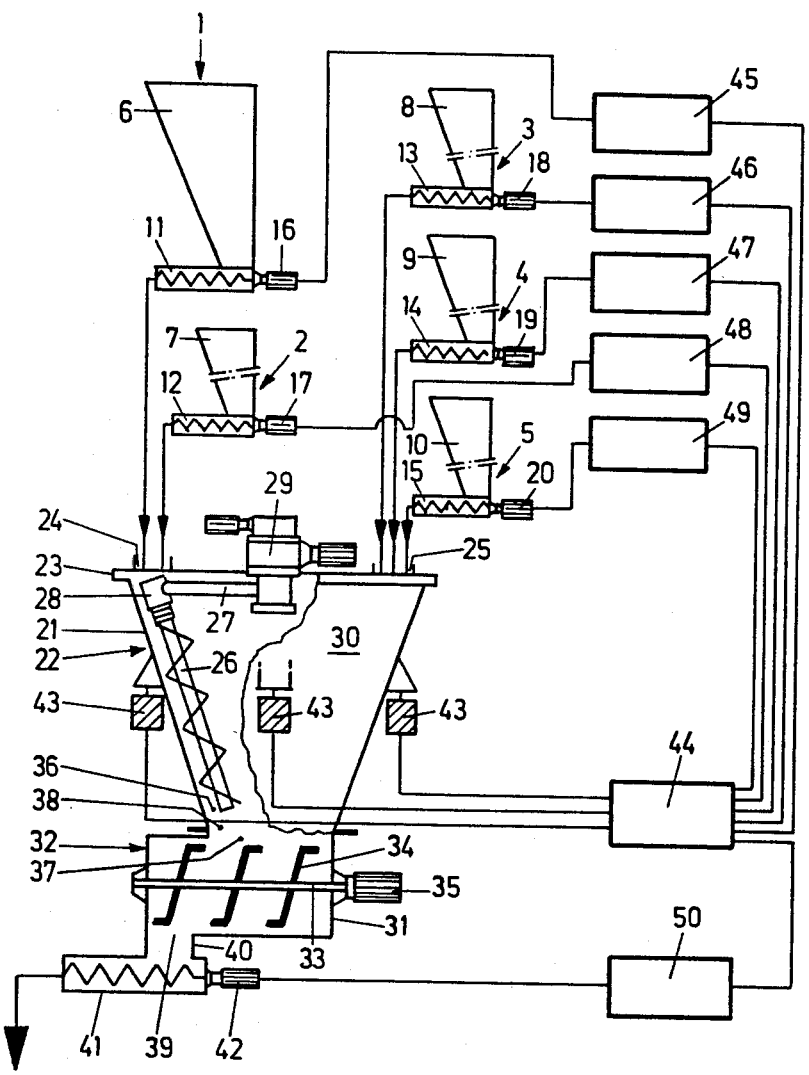
FIG. 1 is a diagrammatic view of one embodiment of an apparatus according to the invention.
Figure 1:
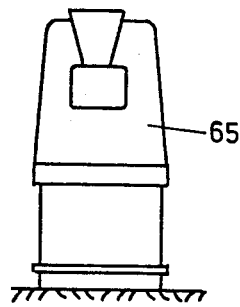

The plant shown in FIG. 1 has five material feed means 1, 2, 3, 4, 5, having in each case, respectively, a material bin 6, 7, 8, 9, 10 and a screw proportioning device 11, 12, 13, 14, 15, each of which follows the respective bin and which is in each case driven by a respective driving motor 16, 17, 18, 19, 20. The proportioning devices 11, 12 or 13, 14, 15 issue by means of lines into a downwardly tapering, funnel-shaped casing 21 of a mixer 22 and specifically by means of respective inlets 24 or 25 formed in a cover 23 of the casing 21. A mixing screw 26 is arranged in the vicinity of the wall of the funnel-shaped casing 21. The upper end of the screw 26 is overhung-mounted on a swivel arm 27 fitted below the cover 23 and an angular gear 28 is intermediately connected. The swivel arm 27 and mixing screw 26 are driven by means of a combined drive 29 supported on the cover 23. Thus, to this extent it constitutes a so-called conical screw mixer 30, which is known per se. The mixer 30 forms a first stage or the pre-mixing part of the mixer 22.

A cylindrical casing 31 of a paddle mixer 32 serving as the second stage or post-mixing part of the mixer 22 is flanged to the lower end of the casing 21. The mixer 32 has an approximately horizontal mixer shaft 33 with projecting mixing elements 34 and which is driven by a driving motor 35. In the vicinity of the lower outlet 36 of the casing 21 of the conical screw mixer 30 and in the vicinity of the immediately following inlet 37 of the cylindrical casing 31 of the paddle mixer 32 is formed a feed-neutral zone 38 over which there is no significant mixing material exchange.

The outlet 39 of the casing 31 is followed via a transfer shaft 40 by a removal device 41 constructed as a proportioning screw and which can be driven by a speed-controllable driving motor 42. The removal device 41 supplies the mixing material, e.g. to an extruder 65.

The unit formed by the mixer 22 and removal device 41, which is fixed thereto, is mounted on three weight transducers 43 forming a weighing machine and which supply signals corresponding to the total weight of the device, including the mixing material contained therein, to the corresponding inputs of a programmable regulating and control device 44. The latter supplies control commands to corresponding control circuits 45, 46, 47, 48, 49 of the driving motors 16 to 20 of the proportioning devices 11 to 15. In addition, the regulating and control device 44 supplies control signals to a speed regulator 50 for driving the motor 42 of the removal device 41.

Figure 2:
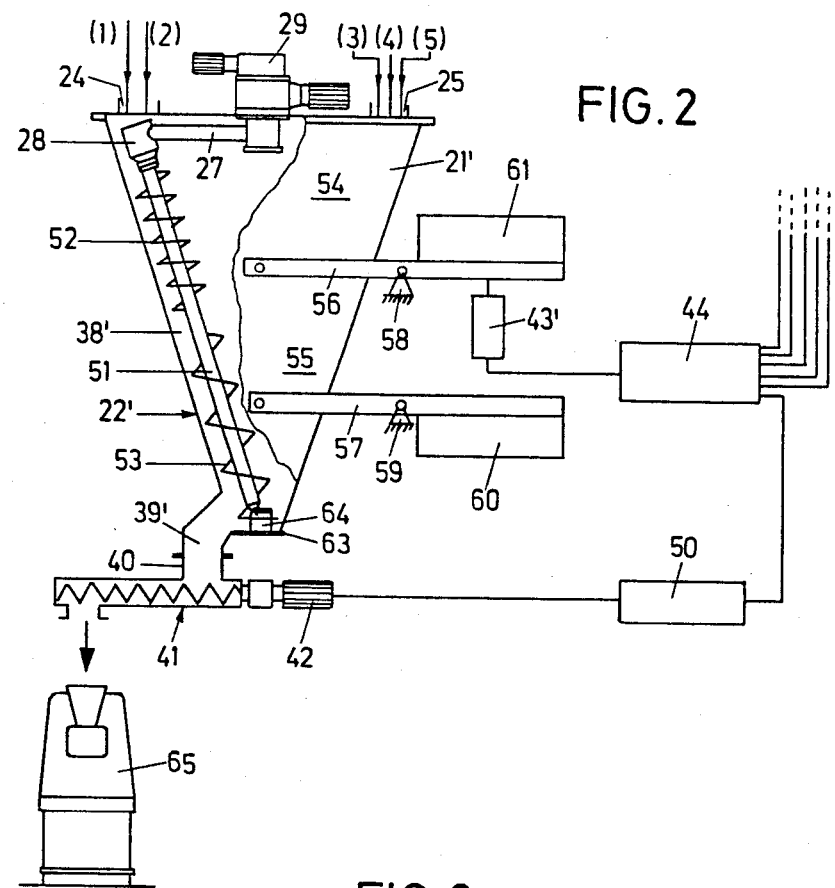
FIG. 2 is a diagrammatic view of a second embodiment of an apparatus according to the invention with a modified mixer.

The embodiment of FIG. 2 differs from that of FIG. 1 only with regards to the construction of the mixer 22' with the following removal device 41, so that there is no need to show the feed means and the associated control circuits. When the same components are used, they will not be described again and will be given the same reference numerals. If functionally identical, but constructionally different components are used, the same reference numerals will be employed, followed by an apostrophe. The mixer 22' has a downwardly tapering, funnel-shaped casing 21' in which, driven by the driving motor 29 via a swivel arm 27 and angular gear 28, is arranged a two-stage mixing screw 51, provided with an upper screw section 52 having a reduced pitch and consequently a reduced mixing action and a lower screw section 53 with a greater pitch and therefore a greater mixing action. The zone over which passes the upper screw section 52 consequently forms the pre-mixing part 54, whereas that passed over by the lower screw section 53 forms a post-mixing part 55. Between these two parts there is a feed-neutral zone 38' over which there is no significant mixing material exchange. Thus, mixing material only flows to the extent that it is removed from the bottom. The lower outlet 39' issues into the transfer shaft 40 of the removal device 41.

The casing 21' of the mixer 22 and consequently also the complete removal device 41 are supported on articulated levers 56, 57 acting in parallelogram-like manner and which are in each case articulated at one end and with a vertical spacing to the container 21' and which are centrally supported on fixed articulations 58, 59. On the side remote from casing 21', a counterweight 60 is provided on the lower articulated lever 57, whilst on the upper articulated lever 56 a tare weight 61 is provided whose distance with respect to articulation 58 is adjustable. The counterweight 60 and tare weight 61 make it possible to tare the weight of mixer 22', together with the removal device 41.

One of the articulation levers 56 is coupled to a weight transducer 43', which is in turn connected to a corresponding input of the regulating and control device 44. This construction also forms a weighing machine for the mixer 22' with removal device 41.

Since the mixing screw 51 in the embodiment of FIG. 2 is much longer than the mixing screw 26 in the embodiment of FIG. 1, it is not mounted in overhung manner on a swivel arm 27 and it is instead mounted on base 63 of the casing 21' by means of a step bearing 64.

The operation is described hereinafter with the aid of the diagram of FIG. 3. 40% by weight of polyethylene powder (feed means 1), 20% by weight of titanium dioxide (feed means 2), 20% by weight of polyethylene wax (feed means 3), 10% by weight of pigment (feed means 4) and 10% by weight of stabilizer (feed means 5) are to be mixed and supplied to an extruder 65. The total throughput is 500 kg/h. Addition is to take place in a total of 10 charges per hour. The residence time of the mixing material in the mixer 22 or 22' is 30 minutes, i.e. approximately 250 kg of mixing material, so that the mixer 22 or 22' must in each case contain 5 charges.

Figure 3:
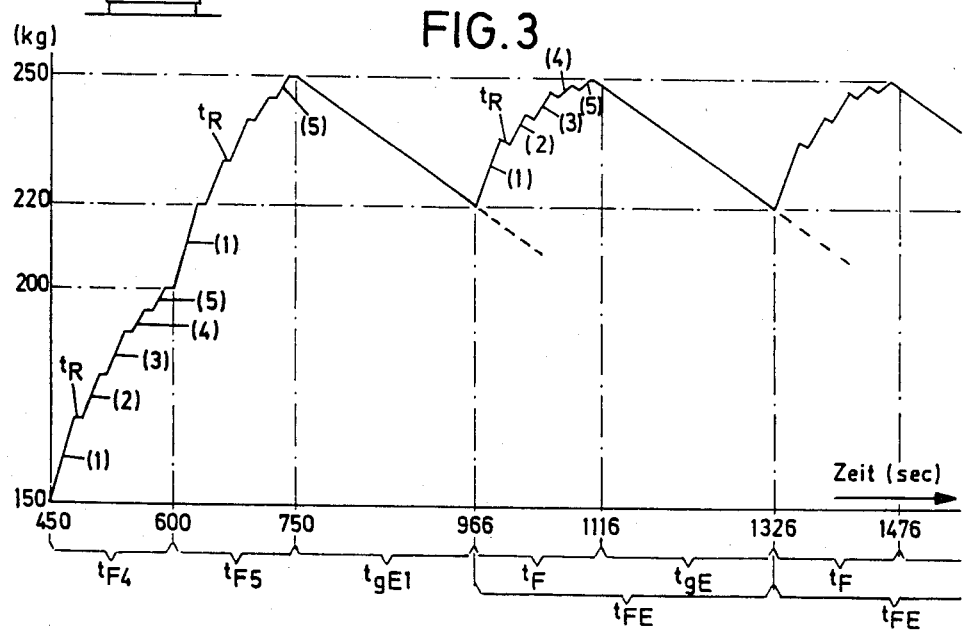
FIG. 3 is a weight-time diagram relating to the operation of the apparatuses according to the invention shown in FIGS. 1 and 2.

In FIG. 3 the total weight of the mixing material in the mixer is plotted against time. It is assumed that three charges are already located in the mixer 22 or 22', having been introduced in the same way as the fourth and fifth charges referred to hereinafter. In order to simplify the description, the individual feed cycles are provided with the bracketed reference numeral of the feed means supplying the corresponding mixing component. Thus, curve portion (1) indicates the addition of polyethylene from the feed means 1. The desired addition values given hereinbefore are predetermined in the programmable regulating and control device 44. Thus, polyethylene is supplied from the feed means 1 when, triggered by the device 44, the control circuit 45 starts up the driving motor 16 of the feed means 1, so that the screw proportioning device 11 supplies polyethylene into the mixer 22 or 22'. The weight increase of the mixer is determined by means of the weight transducer 43 or 43' and is supplied as a corresponding signal to the device 44. On reaching the desired quantity of, in the present case, 20 kg of polyethylene, a signal is supplied to the control circuit 45, which switches off the driving motor 16 and stops the addition of polyethylene. This is followed by a brief dwell time $t_R$ at the end of which the weight transducer 43, 43' determines the actual weight and supplies a corresponding signal to the device 44 for further processing. This is followed in the same way by the addition of the other mixing components from feed means 2, 3, 4, 5, whereby in each case there is a short dwell time $t_R$ between the addition of two mixing components during which a check is made. The mixing screw 26 and paddle mixer 32 or the mixing screw 51 are in operation throughout the filling cycle $t_{F4}$. Following on to the mixing cycle $t_{F4}$ a new and identical filling cycle $t_{F5}$ takes place, at the end of which the first total filling of the mixer 22 or 22' with five charges, corresponding to a 30 minutes residence time of the mixing material in the mixer 22 or 22' is reached. By means of the speed regulator 50, the regulating and control device 44 then starts the operation and control of the removal device 41, the weight reduction of the complete unit being determined continuously by the weight transducers 43 and 43' and is supplied to the device 44, where a comparison is made with the predetermined desired value (500 kg/h) and in the case of differences between the actual value and the desired value there is a corresponding increase in the removal quantity by increasing the speed of the removal device 41 or a reduction of the removal quantity by reducing the speed of the removal device 41. During this first removal time $t_{gE1}$ there is a gravimetrically controlled removal. The correct filling and removal cycle $t_{FE}$ with regards to production and based on the following extruder 65 starts at the end of this first-mentioned total filling and first gravimetrically controlled removal $t_{gE1}$, i.e. when following a first total filling weight of 250 kg, the first gravimetrically controlled removal leads to a total filling weight of 220 kg. This filling and removal cycle starts with a filling cycle $t_F$ during which the individual mixing components are supplied. A volumetrically controlled removal of the mixing material is superimposed on this filling cycle. The removal rate is such that within a complete filling and removal cycle $t_{FE}$, i.e. in the present case within 6 minutes, the quantity of one charge, i.e. in the present case 50 kg of mixture is removed. Since during such a filling cycle $t_F$ accompanied by the simultaneous removal, it is not possible to gravimetrically check the quantity removed, during this time removal by means of the removal device 41 takes place in a volumetrically proportioned manner, i.e. the removal device 41 with a corresponding control by the device 44 is driven by the driving motor 42 via the speed regulator 50 at a speed corresponding to the average speed during the preceding gravimetrically controlled cycle $t_{gE1}$. The resulting removal quantities per unit of time are mathematically determined by the device 44, from which it can be determined whether and when the particular quantities of the individual successively supplied mixing components correspond to the particular desired value. If the filling cycle $t_F$ is ended, there is a gravimetrically controlled removal during a removal cycle $t_{gE}$ until once again the predetermined minimum weight of 220 kg is reached. This is followed by a new filling and removal cycle $t_{FE}$.

I claim:
1. Apparatus for mixing and proportioning a plurality of components said apparatus comprising
    a mixer,
    a plurality of proportioning feed means for the mixing components located upstream of the mixer,
    said feed means being constructed as screw proportioning devices,
    a continuously proportioning removal device with a driving motor for the mixture positioned downstream of the mixer,
    said mixer and said removal device being supported on at least one weight transducer,
    a speed regulator for said driving motor of said removal device,
    a regulating and control device,
    said regulating and control device being operatively connected with said weight transducer, each of said feed means and said speed regulator of said driving motor of said removal device such that said regulating and control device controls said speed regulator according to signals of said weight transducer during a feed sequence pause of said feed means and switches the speed regulator to a constant speed corresponding to the average speed during said preceeding feed sequence pause during a feeding cycle.
2. Apparatus as claimed in claim 1 in which the mixer is constructed as a two-stage mixer.

* * * * *